March 10, 1970    P. WOODHEAD    3,500,200
ELECTRONIC WATTMETERS UTILISING AN AMPLITUDE AND WIDTH
MODULATED PULSE TRAIN Filed Jan. 10, 1968      3 Sheets-Sheet 1

3,500,200
ELECTRONIC WATTMETERS UTILISING AN AMPLITUDE AND WIDTH MODULATED PULSE TRAIN
Peter Woodhead, Stafford, England, assignor to The English Electric Company Limited, London, England, a British company
Filed Jan. 10, 1968, Ser. No. 696,610
Claims priority, application Great Britain, Jan. 10, 1967, 1,241/67
Int. Cl. G01r 7/00, 11/32; G06g 7/16
U.S. Cl. 324—142                                6 Claims

ABSTRACT OF THE DISCLOSURE

This invention relates to a wattmeter in which the power consumed in a circuit is represented by a train of pulses whose height and width are modulated in accordance with the voltage and current in that circuit, the time integral of these pulses thus being representative of the average power consumed in the circuit.

---

This invention relates to wattmeters which may be employed either for the direct measurement and indication of power consumption or which may be used as part of a control scheme, utilising telemetry techniques, for example.

From one aspect, the present invention consists in a wattmeter comprising means for separately monitoring the alternating voltage and current consumed in a circuit, a first modulator for modulating a train of pulses with one of the monitored quantities and governing the mark-space ratio thereof in dependence on the instantaneous values of this quantity, a second modulator for further modulating the modulated pulses with the other monitored quantity in a manner such as to govern their amplitudes in dependence on the instantaneous values of this other quantity, and output means for deriving the average D.C. value of the compositely modulated waveform whereby to determine the power consumed in said circuit.

Preferably, the pulses modulated by the first modulator are applied to the input circuits of a pair of symmetrical amplifiers, the second modulator being effective upon the outputs of said amplifiers. The modulated pulses may be applied in common to the two amplifiers with the second modulator connected in a series mode with the output circuits of these amplifiers, or alternatively these pulses may be applied in series to the two amplifiers with the second modulator connected in a common mode with the output circuits of these amplifiers.

The train of pulses may be produced by a multivibrator and define a "ramp" function, one of the alternating quantities, e.g. current, being superimposed on these pulses, with a rectangular waveform having a variable mark-space ratio dependent on this current, as mentioned above, being produced by applying the resulting "variable datum" ramp pulses to a trigger circuit having preset "on" and "off" trigger levels. In one preferred embodiment, the ramp pulses are triangular, being produced by an integration function performed on a square waveform.

The broad concept of this invention is based on the fact that in any single phase system the average power W is given by $$W = \int vi\, dt$$

where $v$ and $i$ are instantaneous values of voltage and current

Thus, by producing a train of pulses each of which has a height equal to $v$ (or $i$) and a width equal to $i$ (or $v$) then, since the integral of a given wave is the area beneath it, the time integral of these pulses will therefore be proportional to the average power W governing their dimensions.

Thus, this invention provides a simple, reliable and accurate way of measuring true power consumption (watts) and may readily be employed in single phase and polyphase systems. In addition, the polarity of the output derived from the wattmeter is dependent on the direction of power flow and accordingly it is inherently suited to import-export measurement.

In order that the invention may be fully understood, one embodiment thereof will now be described, by way of example, with reference to the accompanying drawings in which.

Figure 2:
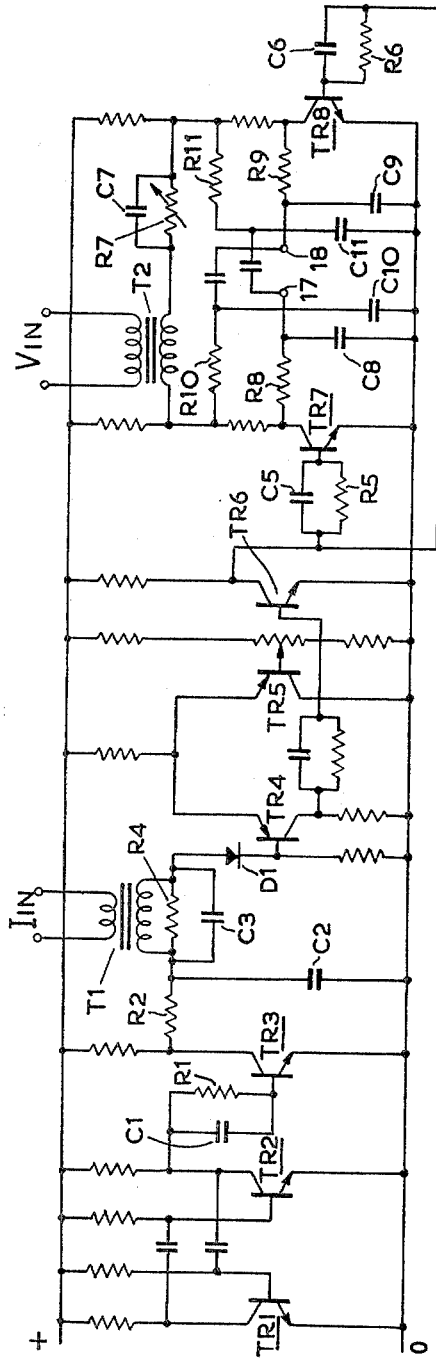
FIGURE 2 illustrates a detailed circuit diagram of this wattmeter.
Figure 3:
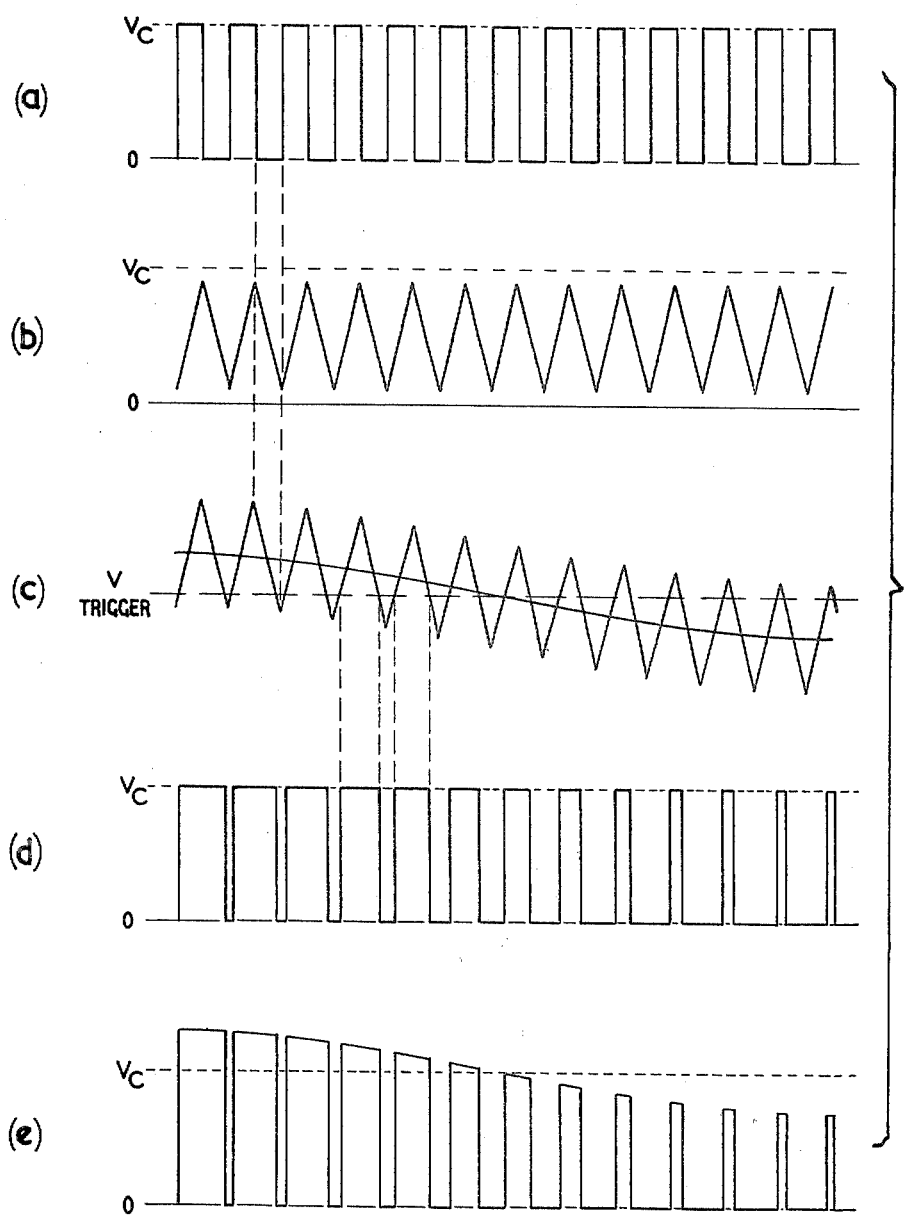
Figure 4:
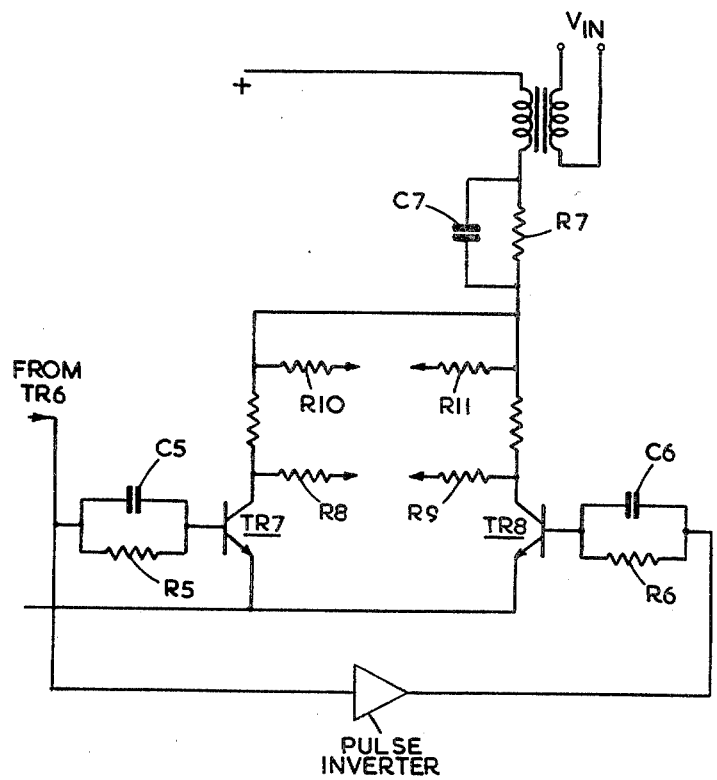

FIGURES 3(a) to 3(e) illustrate typical waveforms obtained at various positions in this circuit; and FIGURE 4 shows a modification of part of the circuit shown in FIGURE 2.

Figure 1:
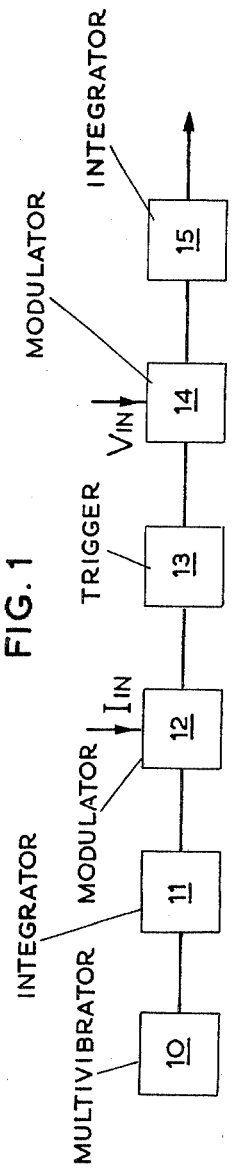
FIGURE 1 illustrates a block diagram of a watt-meter according to this invention.

Referring now to FIGURE 1, the wattmeter comprises an astable multivibrator 10 the square-wave output from which is shaped and then integrated in an integrator 11. The resulting triangular waveform is then modulated by a current input to a modulator 12 and a trigger circuit 13 is switched on and off successively as the modulated wave traverses the trigger level first in one sense and then the other. Following this the variable-width output pulses from the trigger are modulated by the voltage input in a modulator 14 so that the resulting output is in the form of rectangular pulses the widths of which are dependent on the current magnitude and the heights of which are dependent on the voltage magnitude. Finally, these width and height modulated pulses are integrated in an integrator 15, the magnitude of the D.C. output therefrom thus being representative of the average power consumed in the external circuit or apparatus governing the current and voltage inputs.

Referring now to FIGURES 2 and 3(a) to 3(e) the wattmeter is shown and described in more detail. In particular, the multivibrator is freely running at, for example, 10 kc./s. and includes two capacitor-coupled transistors TR1 and TR2. The voltage transitions of the square-wave output from the multivibrator are "sharpened" by a shaper circuit comprising a parallel-connected resistor R1 and capacitor C1 connected in the base circuit of a transistor TR3, and these pulses (FIGURE 3(a)) are then integrated by an RC circuit connected to the collector of this transistor, this integrator comprising a series resistor R2 and a shunt capacitor C2.

The modulator comprises a current transformer T1 the primary of which receives the current input from the external circuit and the secondary of which is bridged by both a resistor R4, and a capacitor C3 for correcting distortion introduced by the secondary inductance, and receives the triangular waveform from the integrator. Accordingly, the voltage developed across R4 is the sum of the triangular waveform and the alternating current input (FIGURE 3(c)), i.e. the alternating input provides the datum about which the triangular waveform excursions are developed. The relative magnitudes of the alternating input and the superimposed triangular waveform are such that every excursion of this waveform traverses the zero datum of the alternating input.

This modulated waveform is then rectified by a diode D1 and applied to a transistor TR4 which, together with transistor TR5 and this diode, form a comparator-type trigger so that a train of positive pulses is produced on the collector of TR4 (FIGURE 3(d)) having a mark-space ratio which varies in dependence on the duration for which each excursion of the triangular waveform exceeds the trigger level of this circuit, determined by the base voltage on TR5.

Following this, the pulses are amplified in a driver stage including a transistor TR6 and are then applied in common to transistors TR7, TR8 operating synchronously in a two-stage amplifier having matched operating characteristics, parallel-connected RC circuits R5, C5 and R6, C6 being effective to "sharpen" the pulse transitions. The collector output from these transistors is modulated by the voltage input to the primary of a transformer T2, the secondary winding of this transformer being connected in series mode (push-pull) with the transistors TR7, TR8, so that the resulting pulses appearing at the collector electrode of each of these transistors are now amplitude modulated as well as width modulated (FIGURE 3(e)). A parallel-connected preset resistor R7 and capacitor C7 provide the necessary phase shift to the voltage input in order to bring it into the same phase relationship with the current as exists in the external circuit, i.e. it compensates for the phase shift imparted to the current by the transformer T1, etc.

Two RC integrating circuits R8, C8 and R9, C9 are connected to the collector electrodes of TR7, TR8 and provide a D.C. output across output terminals 17, 18 of this double-ended stage which is proportional to the difference between the mean D.C. level of the alternating component of the waveform appearing at the collector of transistor TR7 (FIGURE 3(e)) as modified by the mean D.C. level of the variable width pulses between the upper and lower limits of this component, and the similar waveform at the collector of transistor TR8. Additional smoothing is provided by RC circuits R10, C10 and R11, C11, the junction of one circuit being connected to the output terminal 18 through a coupling capacitor and the junction of the other being connected to the terminal 17 through another capacitor. These two additional integrators function to reduce the A.C. ripple components still present at the output after smoothing by R8, C8; R9, C9. In particular, any such A.C. components are phase opposed at the output and are phase shifted from the original voltage input by the integrating network but the provision of these additional networks produces similarly phase shifted components and by cross-coupling through the capacitors to the terminals 17, 18 in the manner shown the original ripple on the output is cancelled.

The D.C. output is thus representative of the average power in the external circuit from which the current and voltage is monitored, this output being bidirectional above a reference level enabling all the capacitors employed in the associated integrating circuits to be of the polarised kind.

This output may then conveniently be employed to drive an indicating instrument or control device, or be employed in a telemetry scheme, etc., and the relative polarity of the D.C. output indicates the direction of power flow (import or export) since, if the direction of flow is reversed, there is a 180° phase change between the current and voltage inputs which results in the absolute magnitudes of the outputs on terminals 17 and 18 effectively being inter-changed so that the relative sense of the difference between these magnitudes changes also.

It is to be understood that various details of the circuit have been omitted for clarity, e.g. temperature stabilizers, signal limiters etc., and that various modifications may be made to the circuit described above. For example, the phase correction may be effected at the current input instead of the voltage input and by suitable interconnection of the input transformers the circuit may readily be made to measure VAR's. In addition, the current and voltage inputs may be interchanged without affecting the output quantity.

Furthermore, a Schmitt trigger may be employed instead of the comparator-type shown and the output stage may conveniently be modified as shown in FIGURE 4 so as to provide the pulse inputs to the transistors TR7, TR8 in a series mode (i.e. phase opposed) instead of the common mode, with the voltage input being common to these transistors.

I claim:
1. A wattmeter comprising
monitoring means for separately monitoring the alternating voltage and current consumed in a circuit,
a pulse generator for generating a train of pulses,
a first modulator connected to both the monitoring means and the pulse generator for modulating the pulses with one of the monitored quantities,
level sensing means responsive to the modulated waveform from said modulator for deriving therefrom pulses having a mark-space ratio dependent on the instantaneous value of said monitored quantity,
a pair of amplifiers having matched operating characteristics,
connector means for applying the modulated pulses from said level-sensing means in common to both said amplifiers,
a second modulator connected to the monitoring means and connected in common to said amplifiers for further modulating the modulated pulses with the other monitored quantity whereby to govern the amplitude thereof in dependence of the instantaneous values of this other monitored quantity, and
integrator means for coupling together the modulated outputs from the two amplifiers and for deriving therefrom the average D.C. value of the composite modulated waveform.
2. A wattmeter according to claim 1, wherein the integrator circuit comprises
first RC circuits separately connected to each amplifier for individually smoothing the modulated outputs therefrom and
second RC circuits cross-coupled between the outputs from the two amplifiers whereby to reduce the affect of any ripple components on the average D.C. valve obtained.
3. A wattmeters according to claim 1, comprising
a phase shift network connected to both the monitoring means and one of the modulators for phase shifting the associated modulating quantity whereby to compensate for any phase shift imparted by the wattmeter circuit to either of the modulating quantities.
4. A wattmeter comprising
monitoring means for separately monitoring the alternating voltage and current consumed in a circuit,
a pulse generator for generating a train of pulses triangular in form,
a first modulator transformer coupled to both the monitoring means and the pulse generator for modulating the triangular pulses with one of the monitored quantities,
a trigger circuit connected to the first modulator and responsive to the modulated pulses, the trigger circuit having a preset on-off level whereby the mark-space ratio of said pulses is varied in dependence on the modulating quantity as the triangular pulses traverse the said level,
a pair of amplifiers having matched operating characteristics and each having an input and an output circuit,
connector means for applying the modulated pulses from said trigger circuit to the input of each amplifier,
a second modulator connected to the monitoring means and transformed coupled in common to the outputs of said amplifiers for further modulating the modulated pulses with the other monitored quantity whereby to govern the amplitudes thereof in dependence on the instantaneous values of this other monitored quantity, and integrator means, said integrator means comprising
first smoothing circuits separately connected to each amplifier for individually smoothing the modulated outputs whereby to derive therefrom the average D.C. value of the composite modulated waveform, and
second smoothing circuits cross-coupled between the outputs from the two amplifiers whereby to reduce the affect of any ripple components on this average D.C. value.

5. A wattmeter according to claim 4, wherein the modulated pulses are applied in common to the pair of amplifiers and wherein the second modulator is connected in a series mode with the output circuits of these amplifiers.

6. A wattmeter according to claim 4, wherein the modulated pulses are applied in series to the pair of amplifiers and wherein the second modulator is connected in a common mode with the output circuits of these amplifiers.

References Cited

UNITED STATES PATENTS 3,358,129  12/1967  Schultz _____ 235—194

FOREIGN PATENTS 1,061,177  11/1953  France.

OTHER REFERENCES

H. R. Ryerson: "Instruments and Control Systems," January 1963, pp. 95–97.

ALFRED E. SMITH, Primary Examiner

U.S. Cl. X.R.

235—194